US011860750B2

(12) United States Patent
   Banks

(10) Patent No.: US 11,860,750 B2
(45) Date of Patent: **\*Jan. 2, 2024**

(54) SYSTEMS AND METHODS FOR CLOUD-BASED TESTING OF POS DEVICES

(71) Applicant: Worldpay, LLC, Symmes Township, OH (US)

(72) Inventor: Walter Banks, Chandler, AZ (US)

(73) Assignee: Worldpay, LLC, Symmes Township, OH (US)

( \* ) Notice: Subject to any disclaimer, the term of this patent is extended or adjusted under 35 U.S.C. 154(b) by 149 days.

This patent is subject to a terminal disclaimer.

(21) Appl. No.: 17/455,531

(22) Filed: Nov. 18, 2021

(65) Prior Publication Data

US 2022/0075700 A1  Mar. 10, 2022

Related U.S. Application Data

(63) Continuation of application No. 16/227,325, filed on Dec. 20, 2018, now Pat. No. 11,210,190.

(51) Int. Cl.
   *G06F 11/26* (2006.01)
   *G06Q 20/20* (2012.01)
   *G06F 11/263* (2006.01)

(52) U.S. Cl.
   CPC .......... *G06F 11/261* (2013.01); *G06F 11/263* (2013.01); *G06Q 20/20* (2013.01)

(58) Field of Classification Search
   CPC ..... G06F 11/261; G06F 11/263; G06Q 20/20; G06Q 20/4016; G06Q 20/405; G06Q 20/4093; G06Q 20/202; G07G 3/00; G07G 3/006
   See application file for complete search history.

(56) References Cited

U.S. PATENT DOCUMENTS

| 8,984,341 B1\* | 3/2015 | Chandrasekharapuram ................ H04L 43/50 714/32 |
| 2007/0226542 A1\* | 9/2007 | Beeston ................ G06F 11/261 714/33 |
| 2010/0121701 A1 | 5/2010 | Nguyen et al. |

(Continued)

OTHER PUBLICATIONS

Alex Groce et al., In Proceedings of the International Symposium on Software Testing and Analysis (ISSTA 2012), Minneapolis, MN, USA, Jul. 2012.

*Primary Examiner* — Matthew M Kim
*Assistant Examiner* — Matthew N Putaraksa
(74) *Attorney, Agent, or Firm* — Bookoff McAndrews, PLLC

(57) ABSTRACT

A computer-implemented method for cloud-based testing of a payment network may include receiving a test configuration for testing a payment processing network, configuring a simulated worker generator for generating a plurality of simulated workers according to the received test configuration, reading commands to be executed by each simulated worker among the plurality of simulated workers from a command bank according to the received test configuration, configuring the plurality of simulated workers according to the commands and the received test configuration, starting a swarm test of the payment processing network by the plurality of simulated workers, reading results of the swarm test from the plurality of simulated workers, and saving the results to storage.

20 Claims, 8 Drawing Sheets

(56) References Cited

U.S. PATENT DOCUMENTS

| | | |
|---|---|---|
| 2016/0260072 A1 | 9/2016 | Badger et al. |
| 2017/0118154 A1* | 4/2017 | Venkatakrishnan ........................ H04L 51/216 |
| 2017/0200148 A1* | 7/2017 | Ulrich .................. G07G 1/0009 |
| 2017/0212822 A1* | 7/2017 | Idrisov .................. G06F 9/5061 |
| 2017/0293544 A1* | 10/2017 | Katayama ............ G06F 11/2733 |
| 2018/0068284 A1* | 3/2018 | Wudaru ................. G06Q 20/12 |
| 2019/0197533 A1* | 6/2019 | Edwards ............ G06Q 20/3825 |
| 2019/0243737 A1* | 8/2019 | Savino ................ G06F 11/3696 |
| 2019/0266584 A1* | 8/2019 | Walters ................ G06Q 20/202 |
| 2019/0361901 A1* | 11/2019 | Purves .................. G06Q 20/20 |
| 2019/0379887 A1 | 12/2019 | Marino et al. |
| 2020/0387905 A1 | 12/2020 | Kogure et al. |
| 2022/0405745 A1* | 12/2022 | Pratz ........................ H04L 9/32 |

* cited by examiner

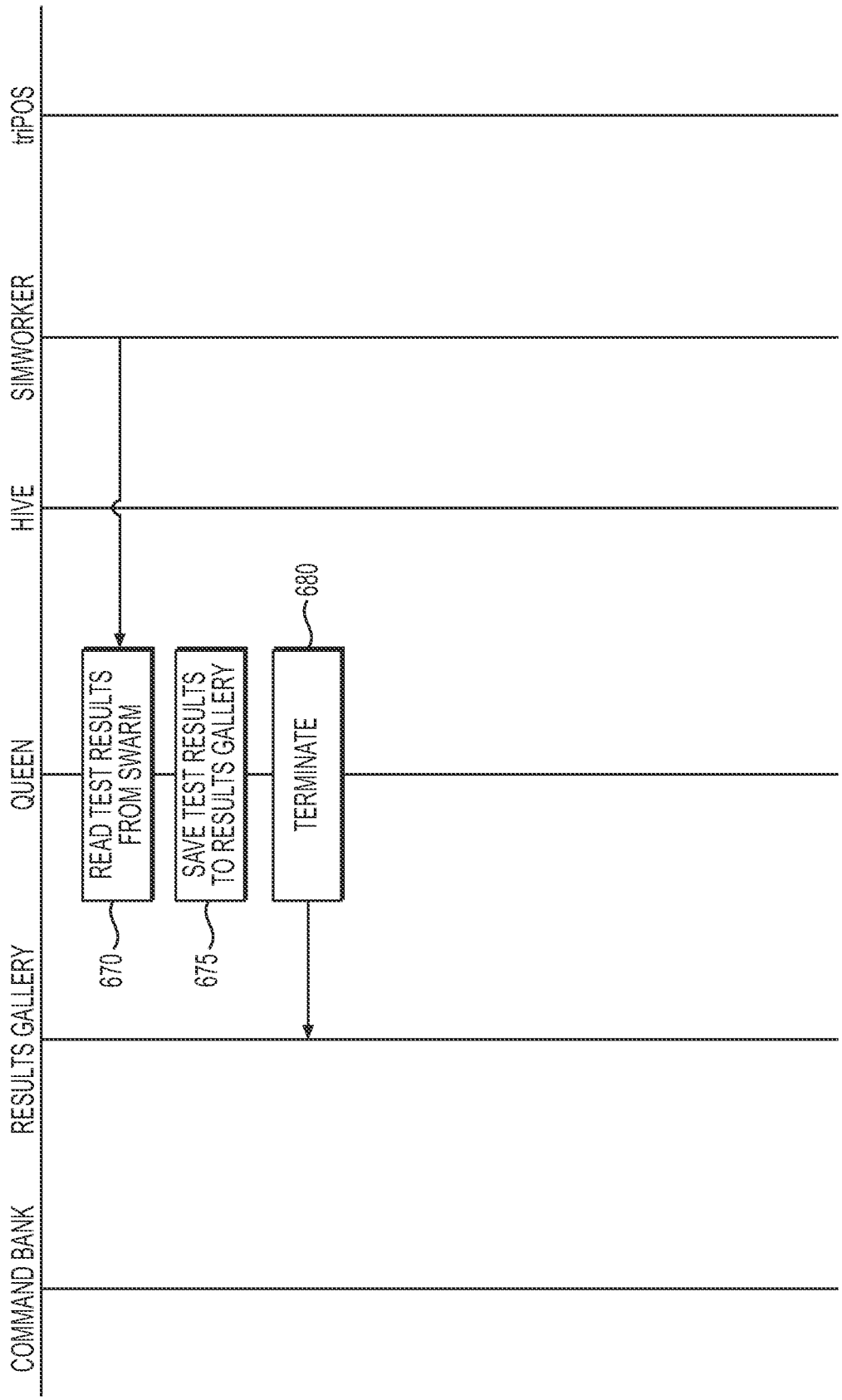

SYSTEMS AND METHODS FOR CLOUD-BASED TESTING OF POS DEVICES

CROSS-REFERENCE TO RELATED APPLICATION(S)

This patent application is a continuation of and claims the benefit of priority to U.S. application Ser. No. 16/227,325, filed on Dec. 20, 2018, the entirety of which is incorporated herein by reference.

TECHNICAL FIELD

Various embodiments of the present disclosure relate generally to systems and methods for electronic payment processing and, more particularly, to automated testing of cloud-based payment processing systems using multiple autonomous simulated clients.

BACKGROUND

Traditionally, merchants and other store owners have point of sale (POS) terminals that can accept check or payment card from consumers for goods and services. Such POS systems may include personal identification number (PIN) pads at which a consumer may enter payment and/or personal information in order to complete payment processing requests for purchases. A cloud based payment network environment enables POS systems to process credit/debit transactions by allowing many client (PIN pad) devices to connect to it and submit transactions for processing. Such a payment network environment may accept submitted transactions from a large number of clients. However, one challenge for a merchant is to determine how many clients can connect at once and how many transactions can be processed at a given moment in parallel. It is important to know the system's limitations and strengths so the merchant can be proactive in providing a good customer experience.

Automated testing of a POS system may be accomplished by generating synthetic transactions and submitting these generated transactions through the POS system's API. However, merely submitting individual synthetic transactions may not adequately simulate the stress on a POS system of interacting with a client device. In addition, client devices may interact with a POS system using differing protocols and languages, which may not be adequately simulated in conventional testing systems. That is, a simulation of a number of users of a POS system may not adequately simulate the load placed on the POS system by a number of client devices.

The present disclosure is directed to overcoming one or more of these above-referenced challenges.

SUMMARY OF THE DISCLOSURE

According to certain aspects of the present disclosure, systems and methods are disclosed for cloud-based testing of a payment network.

In one embodiment, a computer-implemented method is disclosed for cloud-based testing of a payment network, the method comprising: receiving a test configuration for testing a payment processing network, configuring a simulated worker generator for generating a plurality of simulated workers according to the received test configuration, reading commands to be executed by each simulated worker among the plurality of simulated workers from a command bank according to the received test configuration, configuring the plurality of simulated workers according to the commands and the received test configuration, starting a swarm test of the payment processing network by the plurality of simulated workers, reading results of the swarm test from the plurality of simulated workers, and saving the results to storage.

In accordance with another embodiment, a system is disclosed for cloud-based testing of a payment network, the system comprising: a data storage device storing instructions for cloud-based testing of a payment network in an electronic storage medium; and a processor configured to execute the instructions to perform a method including: receiving a test configuration for testing a payment processing network, configuring a simulated worker generator for generating a plurality of simulated workers according to the received test configuration, reading commands to be executed by each simulated worker among the plurality of simulated workers from a command bank according to the received test configuration, configuring the plurality of simulated workers according to the commands and the received test configuration, starting a swarm test of the payment processing network by the plurality of simulated workers, reading results of the swarm test from the plurality of simulated workers, and saving the results to storage.

In accordance with another embodiment, a non-transitory machine-readable medium storing instructions that, when executed by the a computing system, causes the computing system to perform a method for cloud-based testing of a payment network, the method including: receiving a test configuration for testing a payment processing network, configuring a simulated worker generator for generating a plurality of simulated workers according to the received test configuration, reading commands to be executed by each simulated worker among the plurality of simulated workers from a command bank according to the received test configuration, configuring the plurality of simulated workers according to the commands and the received test configuration, starting a swarm test of the payment processing network by the plurality of simulated workers, reading results of the swarm test from the plurality of simulated workers, and saving the results to storage.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 6A and 6B depict a communication diagram in a method for cloud-based testing of an electronic payment transactions network, according to one or more embodiments.

DETAILED DESCRIPTION OF EMBODIMENTS

Various embodiments of the present disclosure relate generally to stress testing of payment processing systems using multiple autonomous simulated clients.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Figure 1:
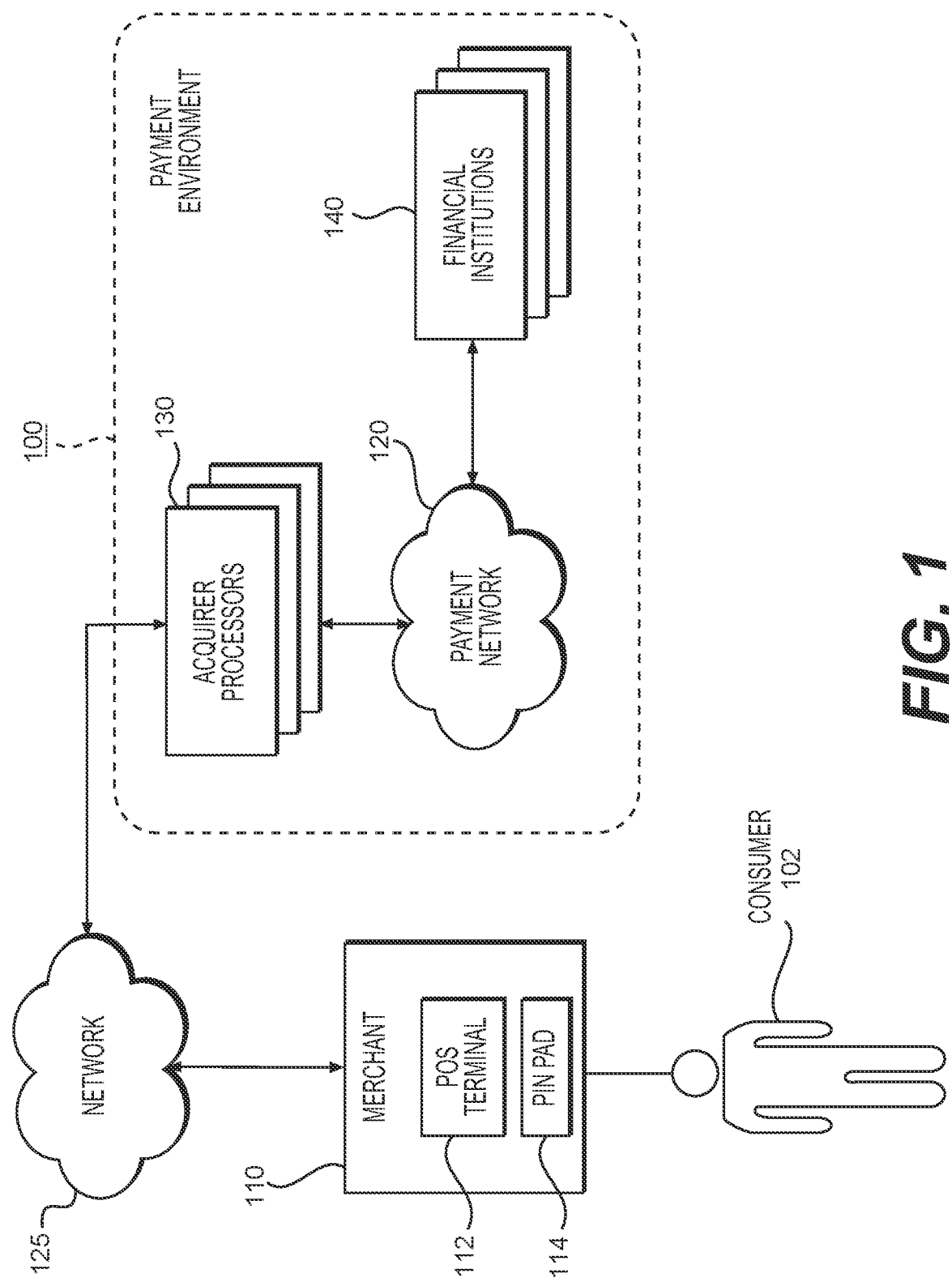
FIG. 1 depicts a block diagram of an electronic payment processing system.
Figure 2:
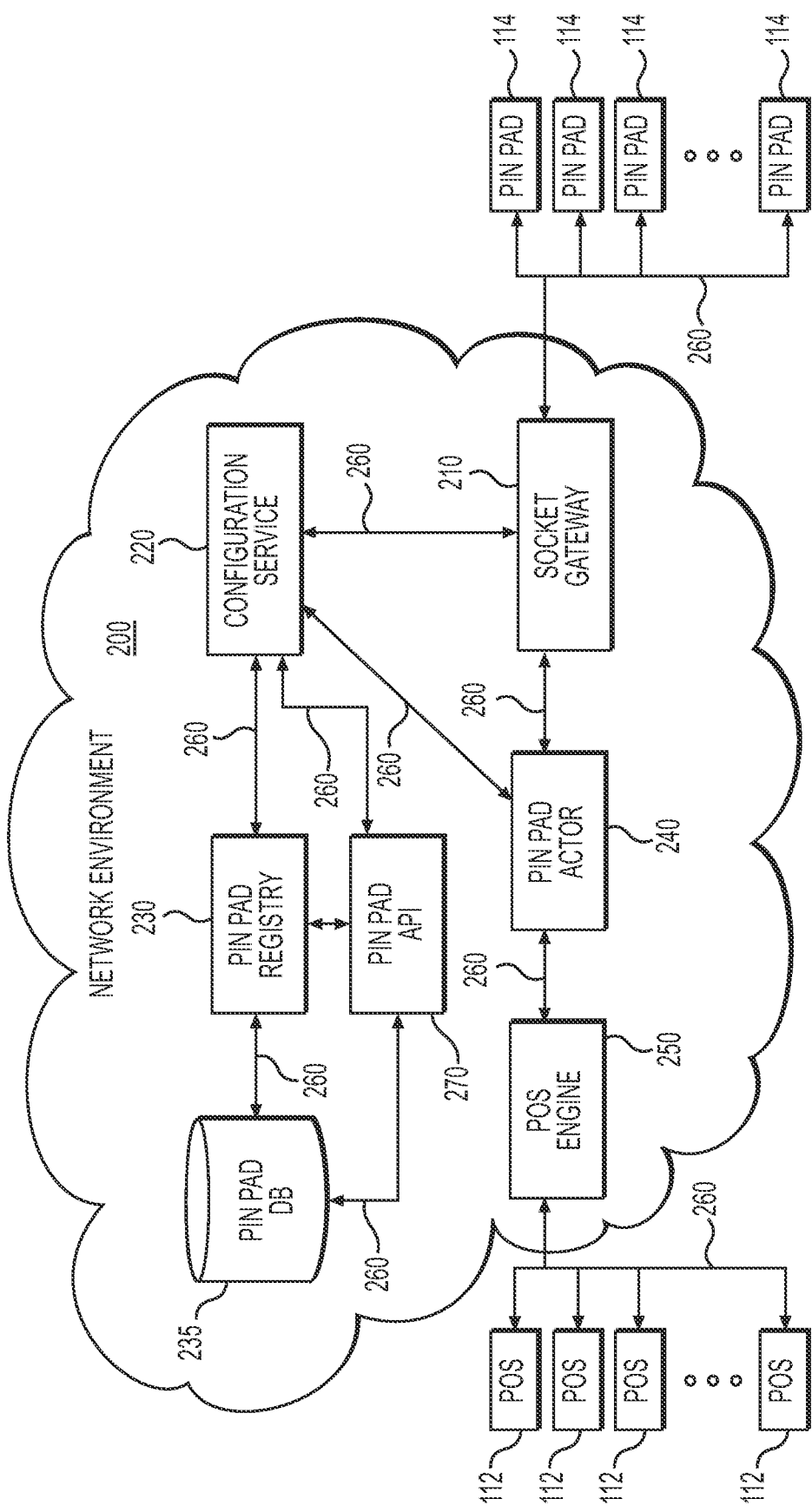
FIG. 2 depicts an exemplary system infrastructure for a cloud-based electronic payment transactions network, according to one or more embodiments.

As described above, a merchant may provide systems and infrastructure for processing electronic payment requests related to the purchase of goods and services. The proper functioning of these systems, especially at times of high transaction volume or other circumstances that put a strain on those systems, may be important to the merchant in ensuring customer satisfaction and avoiding costs associated with failed transactions. Proper functioning of these systems may be ensured by thorough testing prior to and during deployment. FIGS. 1 and 2 depict an exemplary electronic payment transactions processing system and an exemplary merchant payment processing infrastructure that may be subject to such testing. FIGS. 3-5, 6A, and 6B depict systems and methods for cloud-based testing of an electronic merchant payment processing infrastructure.

As shown in FIG. 1, in an electronic payment processing system, a consumer 102, during the checkout process with a merchant 110, pays for goods or services from merchant 110 through a POS terminal 112, such as, for example, at a PIN pad 114 associated with POS terminal 112. Consumer 102 may use a payment card as payment and the transaction is processed through a payment environment 100. Because merchant 110 generally can use a different bank or financial institution 140 than consumer 102, an acquirer processor 130 handles the financial transactions that transfer payment between the financial institution 140 of consumer 102 and that of merchant 110. If required, consumer 102 may submit payment information at the PIN pad 114 associated with POS terminal 112 of merchant 110, such as by swiping his or her payment card, inserting his or her chip-based payment card, through wireless near field communication (NFC), etc., or by any other suitable means. Merchant 110 sends a payment request by way of a computer network 125 to an acquirer processor 130. Such a payment request may be sent by PIN pad 114 or POS terminal 112. Alternatively, such a request may be sent by a component that controls a flow of a transaction, such as point of sale (POS) engine 250 depicted in FIG. 2. Acquirer processor 130 requests, by way of payment network 120, an electronic transfer of funds from the received funds to the financial institution 140 associated with merchant 110.

Merchant 110 may provide an infrastructure for processing electronic payment requests. FIGS. 1 and 2 depict an exemplary system infrastructure for payment processing within a merchant environment, according to one or more embodiments.

FIG. 2 depicts an exemplary system infrastructure for payment processing using a payment network environment, according to one or more embodiments. As shown in FIG. 2, payment network environment 200 for processing electronic payment requests between one or more POS devices 112 and one or more PIN pad devices 114 via network communications 260. In general, network environment 200 may include a PIN pad database 235, a PIN pad registry 230, a configuration service 200, a PIN pad API 270, a POS engine 250, a PIN pad actor 240, and a socket gateway 210.

In one embodiment, one or more point of sale (POS) devices 112 may be in communication with the POS engine 250 of network environment 200 via network 260, and one or more PIN pads 114 may be in communication with the socket gateway 210 of network environment 200 via network 260. POS engine 250 may be embodied, for example, as middleware that may command and control each PIN pad and may send a payment request from a POS device 112 to a PIN pad 114. POS engine 250 may be embodied as a semi-integrated solution and may further control each PIN pad 114 on behalf of the POS device software. Such control may include controlling a transaction flow or sequence including, for example, prompting for payment card swipe or insert, sending a transaction request for authorization, prompting for a consumer signature, etc.

As described above, network environment 200 may further include PIN pad actor 240, configuration service 220, PIN pad registry 230 and PIN pad database 235. Socket gateway 210 may send commands to one or more PIN pad(s) 114 and may receive responses from the PIN pad(s) 114. PIN pad actor 240 may provide a virtual representation of the PIN pad 114 and may maintain a current state of the PIN pad 114. Configuration service 220 may, if necessary, configure the PIN pad 114 upon connection of the PIN pad 114 to the infrastructure. PIN pad registry 230 and PIN pad database 235 may maintain configuration data for each PIN pad 114.

According to one or more embodiments, the components of network environment 200 may be connected by the computer network 260, such as, for example, a local area network (LAN) or a wireless network, such as, for example, a Wi-Fi network. However, other network connections among the components of network environment 200 may be used, such as, for example, a wide area network (WAN), the internet, or the cloud.

According to one or more embodiments, the components of network environment 200 may be tested to determine the limitations and strengths of the infrastructure in providing a good customer experience. Methods of cloud-based testing the components of network environment 200 according to one or more embodiments will be discussed with respect to FIGS. 3-5, 6A, and 6B below.

Figure 3:
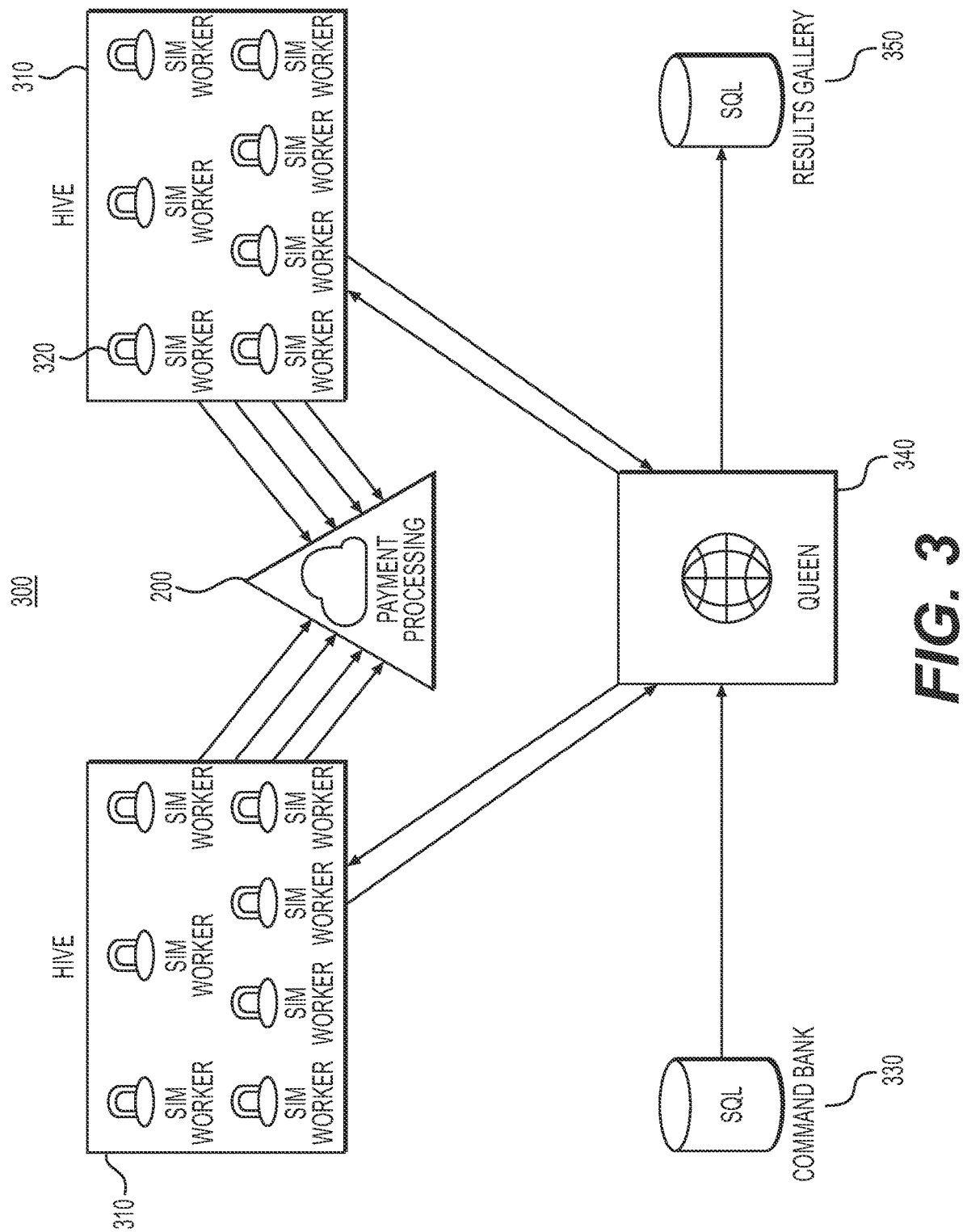
FIG. 3 depicts a system for cloud-based testing of an electronic payment transactions network, according to one or more embodiments.

FIG. 3 depicts a system for cloud-based testing of a payment network, according to one or more embodiments. As shown in FIG. 3, a system 300 for testing of a network environment 200 may include a plurality of simulated workers, or "sim workers," 320, one or more sim worker generators or "hives" 310, a queen 340, a command bank 330, and a results gallery 350, which may store results of the testing. Sim workers 320 may simulate commands and messages generated by a client device according to a programmed command. Each of hives 310 may generate a plurality of simulated workers 320. Queen 340 may be the manager and coordinator of the swarm of sim workers 320, and may instruct hives 310 on creating sim workers 320 and manage the swarm of sim workers 320. Command bank 330 may store commands to be executed by a sim worker 320 to generate synthetic transaction requests submitted to network environment 200. Results gallery 350 may store results of the testing. The swarm of sim workers 320 may simulate the traffic of many clients simultaneously "attacking" the network environment 200 to ensure that the network environment 200 can handle the stress without unexpected consequences.

Queen 340 may operate based on a plan or schedule of testing parameters to coordinate the testing of network environment 200. The plan or schedule of testing parameters may be stored as a configuration file in a format readable by queen 340 (plain text, XML, etc.), may be directly initialized by an operator, or may be driven through an application programming interface (API), such as a RESTful API. Based on the plan or schedule of testing parameters, queen 340 may obtain appropriate commands to implement the plan or schedule of testing parameters from command bank 330, so as to initialize hives 310 to create sim workers 320 with the desired client commands from command bank 330.

Command bank 330 may store commands to be executed by sim workers 320 according to the type of merchant infrastructure the sim worker 320 is to emulate For example, sim worker 320 may emulate different types of PIN pad 114 and/or different POS terminals 112. Each PIN pad 114 or POS terminal 112 may have a different hardware and software configuration and may communicate by a different set of communications protocols and messages. Accordingly, each sim worker 320 may operate according to the hardware and software parameters of the merchant infrastructure to be simulated by the sim worker 320. Commands stored in command bank 330 may be in a client-specific language. New client types of PIN pad 114 and POS terminal 112, including associated hardware, software, and communication parameters, may be added to command bank 330 as needed. Once hives 310 are initialized, queen 340 may start the swarm of sim workers 320 to begin testing network environment 200.

The commands to be executed by sim workers 320 may be specified to apply differing loads to different network environments 200, PIN pads 114, and POS terminals 112 to be tested, and may be specified to apply differing loads over time. In addition, the mix of commands directed to these components may be designed to apply stress to an expected processing bottlenecks or to determine the effect of contradictory or conflicting commands.

Each hive 310 may operate as a "factory" to generate sim workers 320 as needed according to the quantity of sim workers 320, PIN pad and POS terminal type(s) to be simulated by sim workers 320, an identity, URL address, or other identifier of the network environment 200 to be tested, and the commands each sim worker 320 is to simulate. Sim workers 320 may submit transaction requests and other commands to network environment 200 according to the configuration of each sim worker 320. Each sim worker 320 may receive responses from network environment 200 and may submit additional transaction requests or other commands according to the response from network environment 200. Once the testing is complete, queen 340 may capture the results from sim workers 320 and send the results to results gallery 350.

Commands stored in command bank 330 may include, for example, a command ID, device ID, a command name, a command request, command fixed parameters, command variable parameters, a command response, command response fixed parameters, and command response variable parameters, etc. Commands that are necessary for each transaction used in testing may be stored in command bank 330. When sim workers 320 are created, all commands may be stored in the local memory associated with each sim worker 320. Each sim worker may act autonomously such as an actual PIN Pad would. Command request and command response may include triggers to determine what command is being received by sim worker 320 and what response sim worker 320 may send.

Queen 340 may receive commands to implement testing of network environment 200 through a plan or schedule of testing parameters or by way of an API published by queen 340. The commands received by queen 340 may include commands to, for example: configure hives 310 according to a number of sim workers 320 to generate, a type of PIN pad or POS terminal to be simulated by each sim worker 320 (e.g., Verifone PIN pad, Ingenico PIN Pad, etc.), a command bank key identifying a command stored in command bank 330, and an identity, URL address, or other identifier of the network environment 200 to be tested; configure the swarm of sim workers 320 according to a test duration, a number of transactions to be simulated by each sim worker 320, and an increase in load on network environment 200 which is continuous, random, or linear over time; start, stop, or reset a current test of network environment 200; read or receive by way of the API a new plan or schedule of testing parameters; read results of a test from sim workers 320; or terminate.

Figure 4:
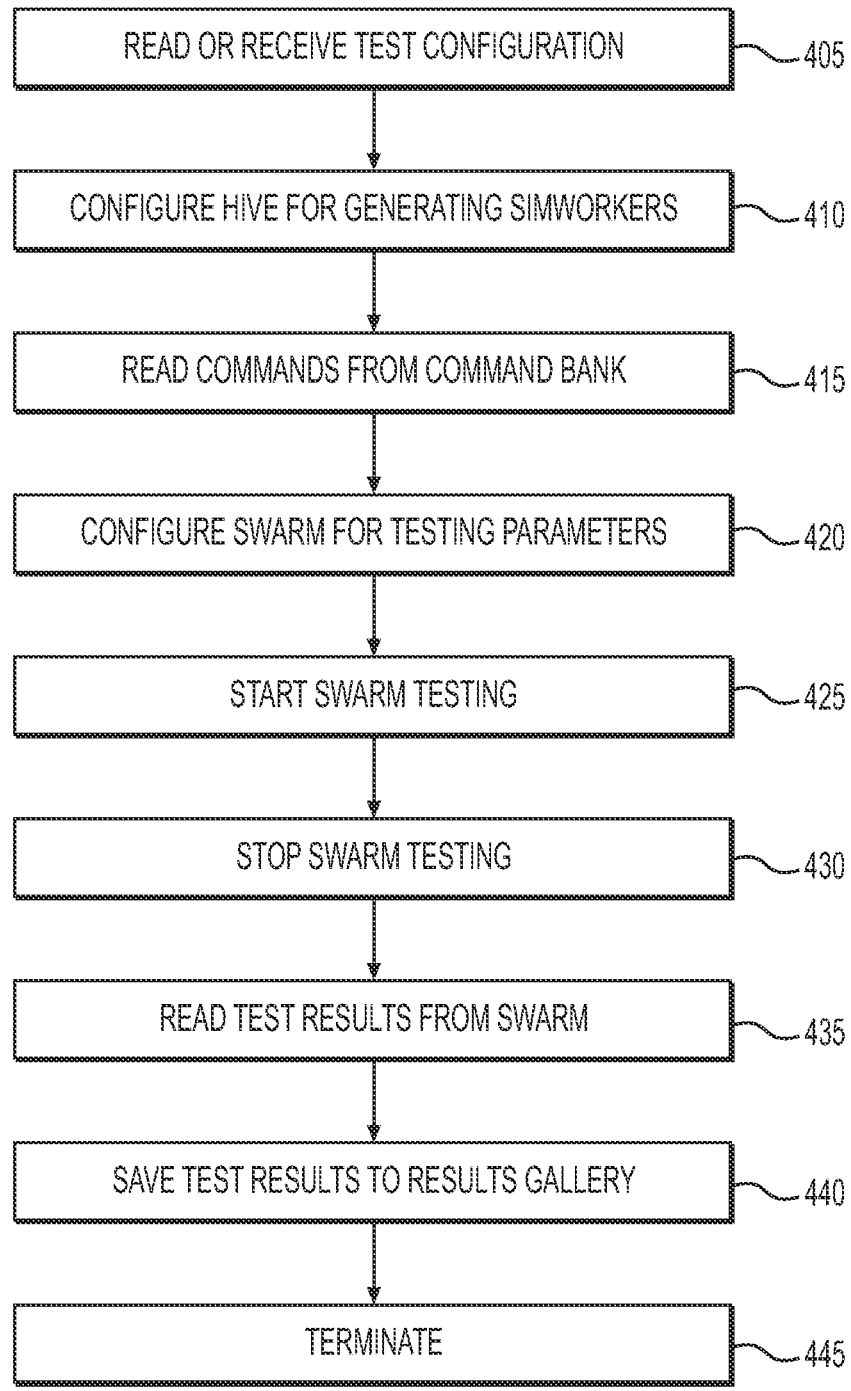
FIG. 4 depicts a flowchart of a method for cloud-based testing of an electronic payment transactions network, according to one or more embodiments.
Figure 5:
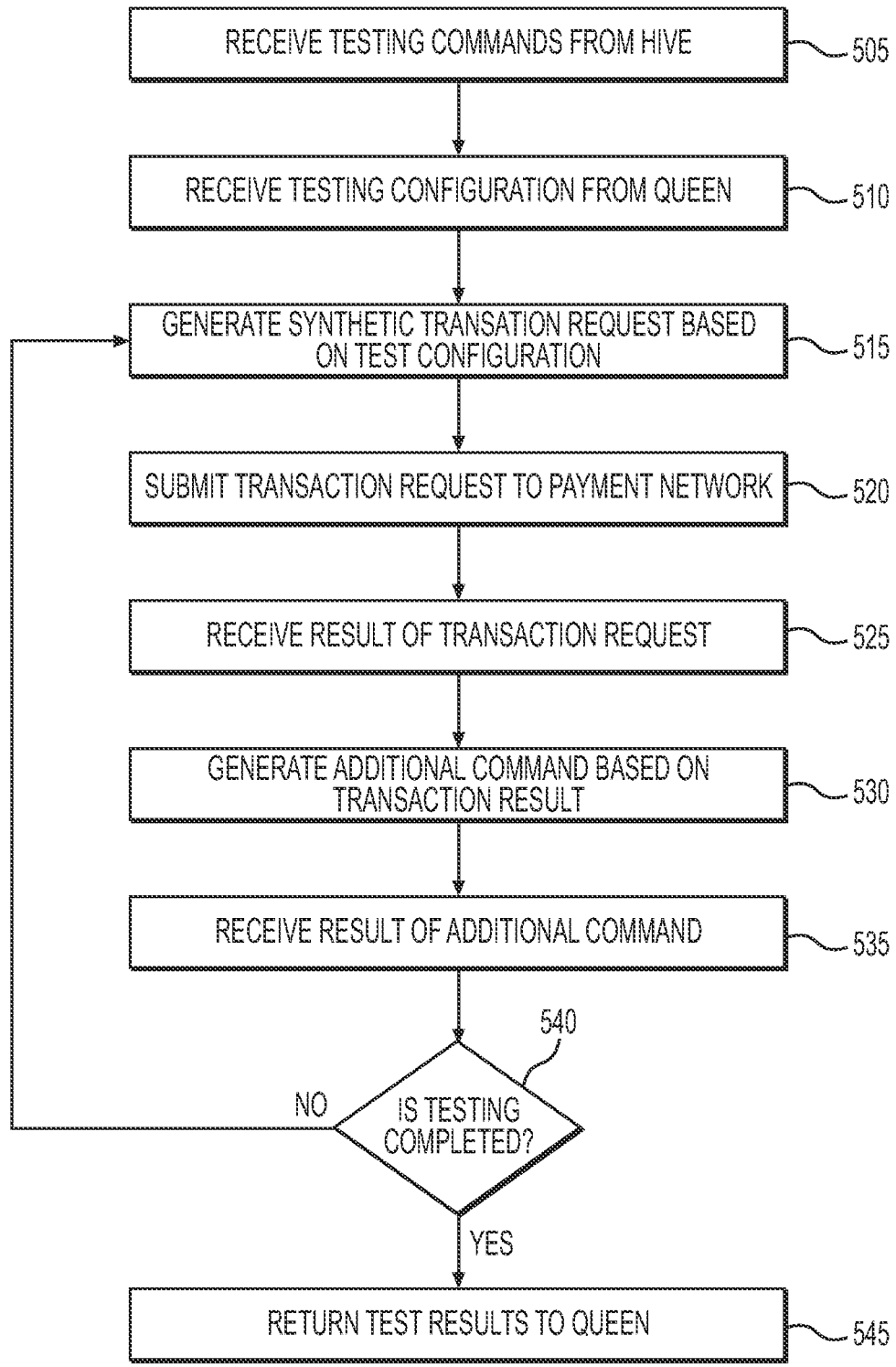
FIG. 5 depicts a flowchart of a method for cloud-based testing of an electronic payment transactions network, according to one or more embodiments.

System 300 for testing of a network environment 200 may be employed to implement a method for cloud-based testing of a payment network. FIGS. 4 and 5 depict flowcharts of methods for cloud-based testing of a payment network, according to one or more embodiments.

As shown in FIG. 4, queen 340 may implement a method for cloud-based testing of a payment network, according to one or more embodiments. In operation 405, queen 340 may read or receive a test configuration including a plan or schedule of testing parameters. The test configuration may be read, for example from a configuration file on disk or a database, such as command bank 330 depicted in FIG. 3, or may be received directly through operator inputs or the API of queen 340. In operation 410, queen 340 may configure hive 310 for generating sim workers 320 according to the test configuration. The configuration may include, for example, quantity of sim workers 320, PIN pad type(s) to be simulated by sim workers 320, an identity, URL address, or other identifier of the network environment 200 to be tested, and the commands each sim worker 320 is to simulate. In operation 415, queen 340 may read commands from command bank 330 that are to be used in implementing the test plan. In operation 420, queen 340 may configure swarm of sim workers 320 for testing parameters. The configuration of the swarm may include, for example, the commands read from command bank 330 and parameters including a test duration, a number of transactions to be simulated by each sim worker 320, and an increase in load on the payment network which may be continuous, random, or linear over time. In operation 425, queen 340 may start testing. In operation 430, queen 340 may stop testing. In operation 435, queen 340 may read test results from swarm by, for example, obtaining the results of test commands and transaction from sim workers 320 or hives 310. In operation 440, queen 340 may save the test results to results gallery. The test results may be saved to the test gallery in any suitable form including, for example, raw data such as spreadsheets, comma separated value (CSV) files, databases such as SQL databases, or other raw data file formats, or as aggregated data such as charts and graphs, etc. In operation 445, queen 340 may terminate.

As shown in FIG. 5, sim worker 320 may implement a method for cloud-based testing of a payment network, according to one or more embodiments. In operation 505, sim worker 320 may receive testing commands from hive 310. Commands may include an identity or address of a payment network to be tested, parameters of one or more test transactions to be submitted to the payment network. In operation 510, sim worker 320 may receive a testing configuration from queen 340. In operation 515, sim worker 320 may generate a synthetic transaction request based on the test configuration. In operation 520, sim worker 320 may submit the synthetic transaction request to the payment network. In operation 525, sim worker 320 may receive a result of the synthetic transaction request from the payment network. For example, the result may be an acceptance of the transaction request, a denial of the transaction request, or another response requiring further actions by sim worker 320. In operation 530, sim worker 320 may generate an additional command based on transaction result. In operation 535, sim worker 320 may receive a result of the additional command from the payment network. In operation 540, sim worker 320 may determine whether testing has been completed based on the testing configuration. If testing has not been completed, then sim worker 320 may return to operation 515 to generate an additional synthetic transaction request based on the test configuration. If testing has been completed, then sim worker 320 may continue with operation 545 and return test results to queen 340.

Figure 6A:
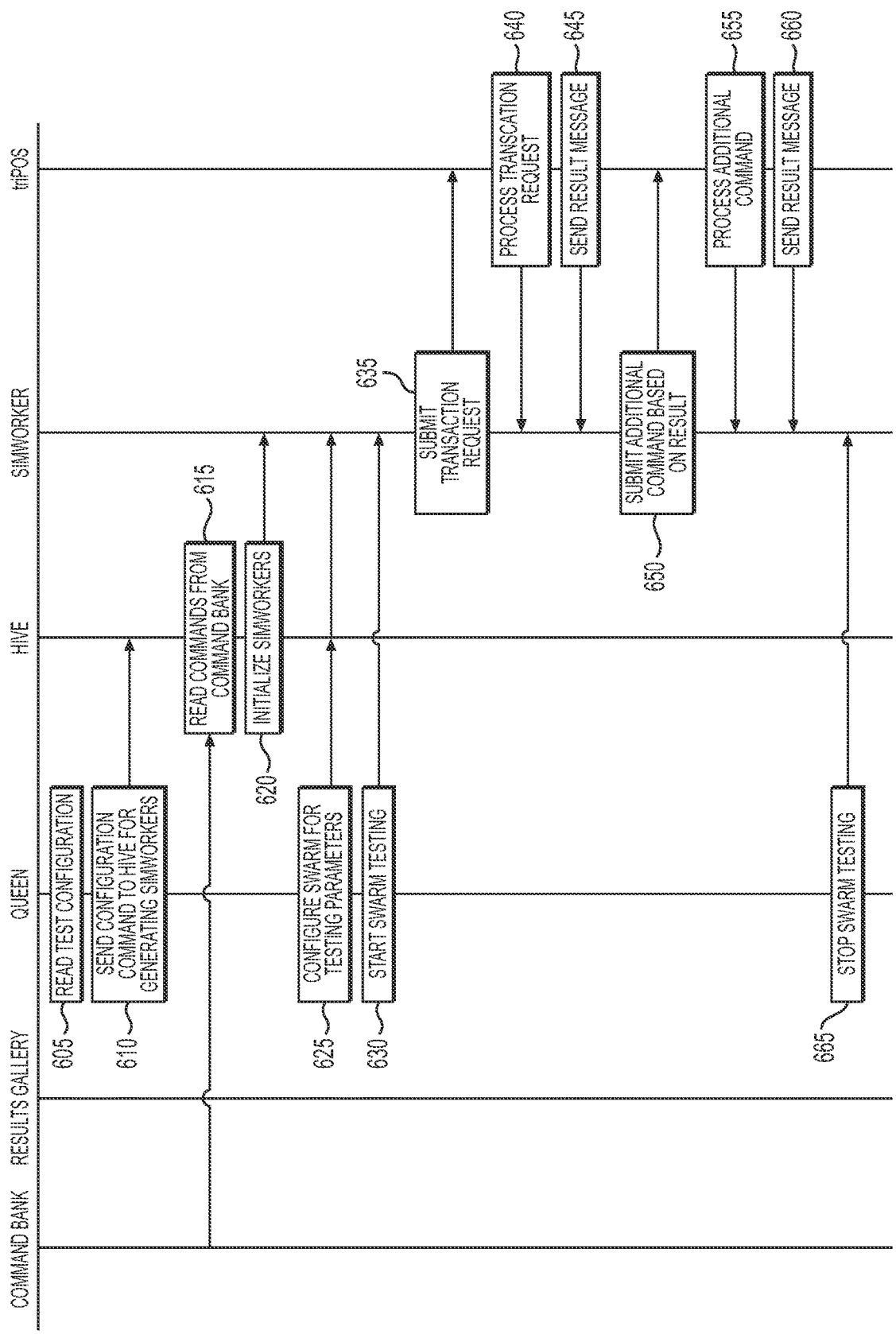

FIGS. 6A and 6B depict a communication diagram in a method for cloud-based testing of a payment network, according to one or more embodiments. As shown in FIGS. 6A and 6B, in operation 605, queen 340 may read or obtain a test configuration. In operation 610, queen may send the configuration command and test parameters to hive 310 for generating sim workers 320. In operation 615, hive 310 may read test commands from command bank 330. In operation 620, hive 310 may initialize a number of sim workers 320. In operation 625, queen 340 may configure the swarm of sim workers 320 for testing parameters. In operation 630, queen 340 may start testing by sim workers 320. In operation 625, sim worker 320 may submit a synthetic transaction request to network environment 200. In operation 630, network environment 200 may process the synthetic transaction request submitted by sim worker 320. In operation 635, network environment 200 may send a result message to sim worker 320. In operation 640, sim worker 320 may submit an additional command to network environment 200 based on the processing result of the synthetic transaction request. In operation 645, network environment 200 may process the additional command submitted by sim worker 320. In operation 650, network environment 200 may send a result message to sim worker 320. In operation 655, queen 340 may stop testing by sim workers 320. In operation 660, queen 340 may read test results from swarm of sim workers 320. In operation 665, queen 340 may save test results of testing to results gallery 350. In operation 670, queen 340 may terminate.

Any suitable system infrastructure may be put into place for cloud-based testing of a payment network. FIGS. 1-3 and the discussion above provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIGS. 1-3. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semi-conductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Figure 7:
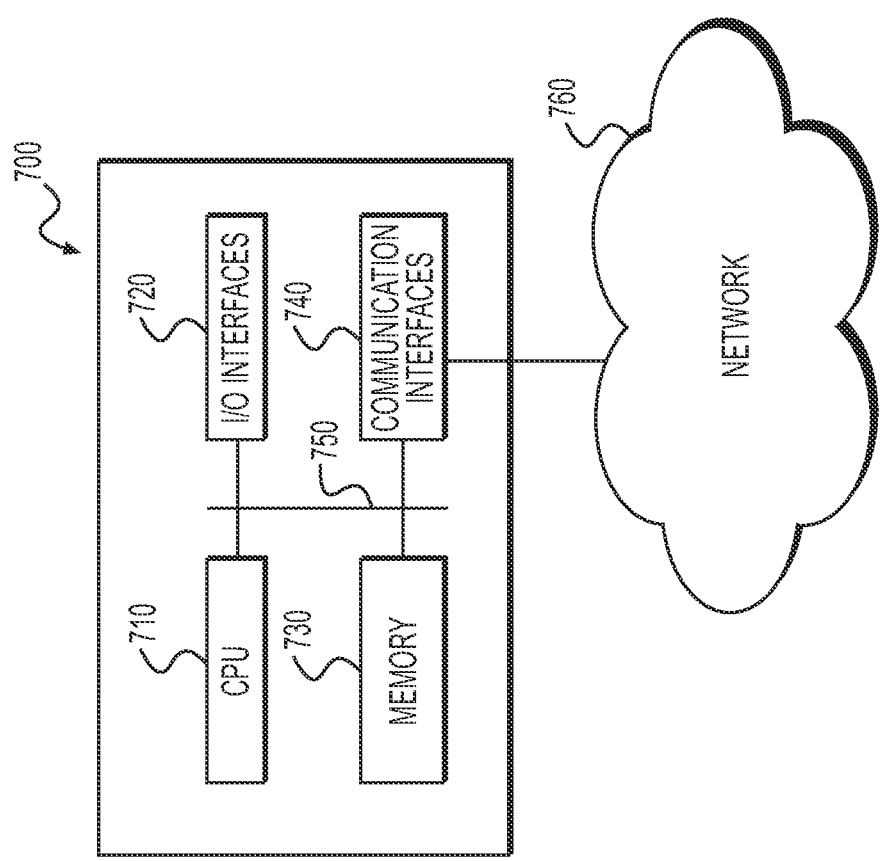
FIG. 7 is a block diagram of an example computing environment, according to one or more embodiments.

For example, the systems and processes described above may be performed on or between one or more computing devices, e.g. configuration service. FIG. 7 illustrates an example computing device. A computing device 700 may be a server, a computing device that is integrated with other systems or subsystems, a mobile computing device such as a smart phone, a cloud-based computing ability, and so forth. The computing device 700 may be any suitable computing device as would be understood in the art, including without limitation, a custom chip, and embedded processing device, a tablet computing device, a POS terminal associated with the merchant 110, a back-office system of a merchant 110, a personal data assistant (PDA), a desktop, laptop, microcomputer, and minicomputer, a server, a mainframe, or any other suitable programmable device. In various embodiments disclosed herein, a single component may be replaced by multiple components and multiple components may be replaced by single component to perform a given function or functions. Except where such substitution would not be operative, such substitution is within the intended scope of the embodiments.

The computing device 700 may include a processor 710 that may be any suitable type of processing unit, for example a general-purpose central processing unit (CPU), a reduced instruction set computer (RISC), a processor that has a pipeline or multiple processing capability including having multiple cores, a complex instruction set computer (CISC), a digital signal processor (DSP), application specific integrated circuits (ASIC), a programmable logic devices (PLD), and a field programmable gate array (FPGA), among others. The computing resources may also include distributed computing devices, cloud computing resources, and virtual computing resources in general.

The computing device 700 may also include one or more memories 730, for example read-only memory (ROM), random access memory (RAM), cache memory associated with the processor 710, or other memory such as dynamic RAM (DRAM), static RAM (SRAM), programmable ROM (PROM), electrically erasable PROM (EEPROM), flash memory, a removable memory card or disc, a solid-state drive, and so forth. The computing device 700 also includes storage media such as a storage device that may be configured to have multiple modules, such as magnetic disk drives, floppy drives, tape drives, hard drives, optical drives and media, magneto-optical drives and media, compact disk drives, Compact Disc Read Only Memory (CD-ROM), compact disc recordable (CD-R), Compact Disk Rewritable (CD-RW), a suitable type of Digital Versatile Disc (DVD) or BluRay disc, and so forth. Storage media such as flash drives, solid-state hard drives, redundant array of individual discs (RAID), virtual drives, networked drives and other memory means including storage media on the processor 710, or memories 730 are also contemplated as storage devices. It may be appreciated that such memory may be internal or external with respect to operation of the disclosed embodiments. It may be appreciated that certain portions of the processes described herein may be performed using instructions stored on a computer readable medium or media that direct computer system to perform the process steps. Non-transitory computable-readable media, as used herein, comprises all computer-readable media except for transitory, propagating signals.

Networking communication interfaces 740 may be configured to transmit to, or receive data from, other computing devices 700 across a network 760. The network and communication interfaces 740 may be, for example, an Ethernet interface, a radio interface, a Universal Serial Bus (USB) interface, or any other suitable communications interface and may include receivers, transmitter, and transceivers. For purposes of clarity, a transceiver may be referred to as a receiver or a transmitter when referring to only the input or only the output functionality of the transceiver. Example communication interfaces 740 may include wire data transmission links such as Ethernet and TCP/IP. The communication interfaces 740 may include wireless protocols for interfacing with private or public networks 760. For example, the network and communication interfaces 740 and protocols may include interfaces for communicating with private wireless networks such as Wi-Fi network, one of the IEEE 802.11x family of networks, or another suitable wireless network. The network and communication interfaces 740 may include interfaces and protocols for communicating with public wireless networks 760, using for example wireless protocols used by cellular network providers, including Code Division Multiple Access (CDMA) and Global System for Mobile Communications (GSM). A computing device 700 may use network and communication interfaces 740 to communicate with hardware modules such as a database or data store, or one or more servers or other networked computing resources. Data may be encrypted or protected from unauthorized access.

In various configurations, the computing device 700 may include a system bus 750 for interconnecting the various components of the computing device 700, or the computing device 700 may be integrated into one or more chips such as programmable logic device or application specific integrated circuit (ASIC). The system bus 770 may include a memory controller, a local bus, or a peripheral bus for supporting input and output devices 720, and communication interfaces 760. Example input and output devices 720 include keyboards, keypads, gesture or graphical input devices, motion input devices, touchscreen interfaces, one or more displays, audio units, voice recognition units, vibratory devices, computer mice, and any other suitable user interface.

The processor 710 and memory 730 may include non-volatile memory for storing computable-readable instructions, data, data structures, program modules, code, microcode, and other software components for storing the computer-readable instructions in non-transitory computable-readable mediums in connection with the other hardware components for carrying out the methodologies described herein. Software components may include source code, compiled code, interpreted code, executable code, static code, dynamic code, encrypted code, or any other suitable type of code or computer instructions implemented using any suitable high-level, low-level, object-oriented, visual, compiled, or interpreted programming language.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for cloud-based testing of a payment network, the method comprising:
reading predetermined commands and predetermined command parameters to be executed by each simulated worker among a plurality of simulated workers from a command bank, wherein the simulated workers emulate a hardware and software configuration of a hardware device;
configuring the plurality of simulated workers according to the predetermined commands and predetermined command parameters, wherein the predetermined commands and predetermined command parameters include a predetermined command from the command bank to generate an additional transaction request submitted by the simulated worker to a payment processing network according to a response received by the simulated worker from the payment processing network; and
starting a test of the payment processing network by the plurality of simulated workers.

2. The computer-implemented method of claim 1, further comprising:

reading results of the test from the plurality of simulated workers; and
saving the results to storage.

3. The computer-implemented method of claim 2, wherein the results are saved to the storage as a spreadsheet, a comma separated value (CSV) file, a database, or as aggregated data including one or more of a chart or a graph.

4. The computer-implemented method of claim 1, wherein the hardware device is a payment PIN pad.

5. The computer-implemented method of claim 1, further comprising:
generating the plurality of simulated workers according to one or more of a specified number of simulated workers, a payment PIN pad type to be simulated by each simulated worker among the plurality of simulated workers, an identifier of the payment processing network, and one or more predetermined commands to be executed by each simulated worker among the plurality of simulated workers.

6. The computer-implemented method of claim 5, wherein the one or more predetermined commands to be executed by each simulated worker further comprise triggers to determine a response received by the simulated worker from the payment processing network.

7. The computer-implemented method of claim 1, wherein the test of the payment processing network is started according to one or more of a test duration, a number of transactions to be simulated by each simulated worker, or an increase in load on the payment processing network, the increase in load being continuous, random, or linear over time.

8. A system for cloud-based testing of a payment network, the system comprising:
a data storage device storing instructions for cloud-based testing of a payment network in an electronic storage medium; and
a processor configured to execute the instructions to perform a method including:
reading predetermined commands and predetermined command parameters to be executed by each simulated worker among a plurality of simulated workers from a command bank, wherein the simulated workers emulate a hardware and software configuration of a hardware device;
configuring the plurality of simulated workers according to the predetermined commands and predetermined command parameters, wherein the predetermined commands and predetermined command parameters include a predetermined command from the command bank to generate an additional transaction request submitted by the simulated worker to a payment processing network according to a response received by the simulated worker from the payment processing network; and
starting a test of the payment processing network by the plurality of simulated workers.

9. The system of claim 8, the method further comprising:
reading results of the test from the plurality of simulated workers; and
saving the results to storage.

10. The system of claim 9, wherein the results are saved to the storage as a spreadsheet, a comma separated value (CSV) file, a database, or as aggregated data including one or more of a chart or a graph.

11. The system of claim 8, wherein the hardware device is a payment PIN pad.

12. The system of claim 8, the method further comprising:
generating the plurality of simulated workers according to one or more of a specified number of simulated workers, a payment PIN pad type to be simulated by each simulated worker among the plurality of simulated workers, an identifier of the payment processing network, and one or more predetermined commands to be executed by each simulated worker among the plurality of simulated workers.

13. The system of claim 12, wherein the one or more predetermined commands to be executed by each simulated worker further comprise triggers to determine a response received by the simulated worker from the payment processing network.

14. The system of claim 8, wherein the test of the payment processing network is started according to one or more of a test duration, a number of transactions to be simulated by each simulated worker, or an increase in load on the payment processing network, the increase in load being continuous, random, or linear over time.

15. A non-transitory machine-readable medium storing instructions that, when executed by a computing system, causes the computing system to perform a method for cloud-based testing of a payment network, the method including:
reading predetermined commands and predetermined command parameters to be executed by each simulated worker among a plurality of simulated workers from a command bank, wherein the simulated workers emulate a hardware and software configuration of a hardware device;
configuring the plurality of simulated workers according to the predetermined commands and predetermined command parameters, wherein the predetermined commands and predetermined command parameters include a predetermined command from the command bank to generate an additional transaction request submitted by the simulated worker to a payment processing network according to a response received by the simulated worker from the payment processing network; and
starting a test of the payment processing network by the plurality of simulated workers.

16. The non-transitory machine-readable medium of claim 15, the method further comprising:
reading results of the test from the plurality of simulated workers; and
saving the results to storage.

17. The non-transitory machine-readable medium of claim 15, wherein the hardware device is a payment PIN pad.

18. The non-transitory machine-readable medium of claim 15, the method further comprising:
generating the plurality of simulated workers according to one or more of a specified number of simulated workers, a payment PIN pad type to be simulated by each simulated worker among the plurality of simulated workers, an identifier of the payment processing network, and one or more predetermined commands to be executed by each simulated worker among the plurality of simulated workers.

19. The non-transitory machine-readable medium of claim 18, wherein the one or more predetermined commands to be executed by each simulated worker further comprise triggers to determine a response received by the simulated worker from the payment processing network.

20. The non-transitory machine-readable medium of claim 15, wherein the test of the payment processing network is started according to one or more of a test duration, a number of transactions to be simulated by each simulated worker, or an increase in load on the payment processing network, the increase in load being continuous, random, or linear over time.

\* \* \* \* \*